United States Patent
Aoki et al.

[11] Patent Number: 5,816,066
[45] Date of Patent: Oct. 6, 1998

[54] AIR CONDITIONER WITH HEATING, COOLING AND REHEAT

[75] Inventors: Hisao Aoki, Maebashi; Susumu Ikeda, Isesaki, both of Japan

[73] Assignee: Sanden Corporation, Japan

[21] Appl. No.: 887,077

[22] Filed: Jul. 2, 1997

[30] Foreign Application Priority Data

Jul. 3, 1996 [JP] Japan .................................. 8-193974

[51] Int. Cl.⁶ .................................................. F25B 29/00
[52] U.S. Cl. ............................................. 62/325; 165/228
[58] Field of Search ................................. 62/325, 89, 90, 62/173, 176.5; 165/42, 48.1, 225, 228

[56] References Cited

U.S. PATENT DOCUMENTS

| | | | |
|---|---|---|---|
| 2,441,270 | 5/1948 | Hoesel | 62/325 |
| 3,625,022 | 12/1971 | Johnson | 62/325 |
| 3,934,642 | 1/1976 | Coulson et al. | |
| 4,223,720 | 9/1980 | d'Orsay et al. | |
| 4,289,195 | 9/1981 | Bellot et al. | |
| 4,356,965 | 11/1982 | Matsushima et al. | |
| 4,456,055 | 6/1984 | Yoshimi et al. | |
| 4,513,808 | 4/1985 | Ito et al. | |
| 4,537,245 | 8/1985 | Nishimura et al. | |
| 4,549,692 | 10/1985 | Busch et al. | |
| 4,562,954 | 1/1986 | Kajita | |
| 4,572,430 | 2/1986 | Takagi et al. | |
| 4,593,852 | 6/1986 | Tajima et al. | |
| 4,611,755 | 9/1986 | Miyanaga et al. | |
| 4,671,073 | 6/1987 | Ohi | |
| 4,681,153 | 7/1987 | Uchida | |
| 4,779,672 | 10/1988 | Seikou et al. | |
| 4,815,658 | 3/1989 | Hidemitsu et al. | |
| 4,834,283 | 5/1989 | Akabane et al. | |
| 4,840,308 | 6/1989 | Akabane et al. | |
| 4,844,150 | 7/1989 | Nakazawa | |
| 4,930,567 | 6/1990 | Akabane et al. | |
| 4,940,083 | 7/1990 | Takenaka et al. | 165/42 |
| 5,048,399 | 9/1991 | Toshihiko et al. | |
| 5,342,027 | 8/1994 | Kawabata | |
| 5,678,761 | 10/1997 | Ikeda | |

FOREIGN PATENT DOCUMENTS

| | | |
|---|---|---|
| 2655554 | 6/1978 | Germany . |
| 57-26010 | 2/1982 | Japan . |
| 57-182514 | 11/1982 | Japan . |
| 57-182515 | 11/1982 | Japan . |
| 58-85711 | 5/1983 | Japan . |
| 58-218417 | 12/1983 | Japan . |
| 58-218420 | 12/1983 | Japan . |
| 2128322 | 4/1984 | United Kingdom . |

Primary Examiner—John M. Sollecito
Attorney, Agent, or Firm—Baker & Botts, L.L.P.

[57] ABSTRACT

An air conditioner has air an duct defining an air path. Cooling and heating devices are provided in the air path, and the cooling and heating devices are disposed in parallel with respect to a longitudinal axis of the air duct. Switching means are provided at positions upstream and downstream of the parallel cooling and heating devices, respectively, for controlling air flow into, and air flow from, the cooling device or the heating device, or both. The size, e.g., the length of the air duct is reduced by the parallel disposition of the cooling and heating devices, thereby reducing the size of the entire air conditioner.

6 Claims, 5 Drawing Sheets

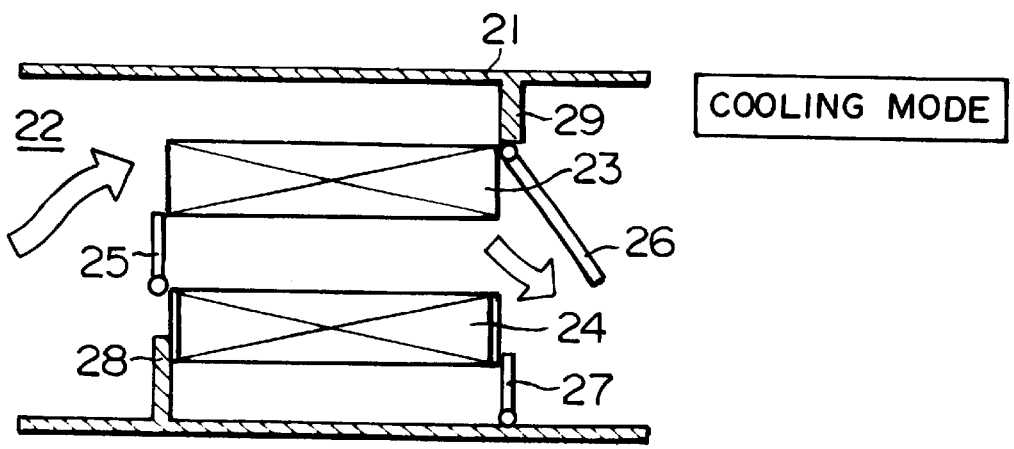
FIG. 1A — COOLING MODE
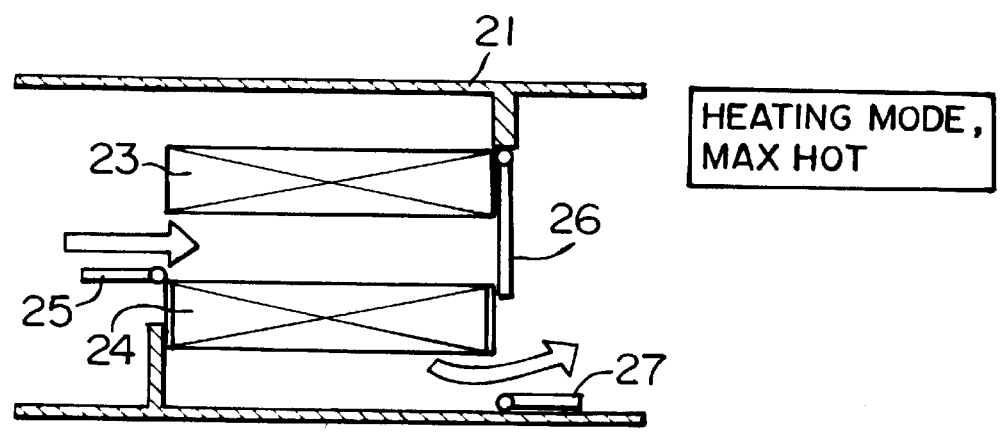
FIG. 1B — HEATING MODE, MAX HOT
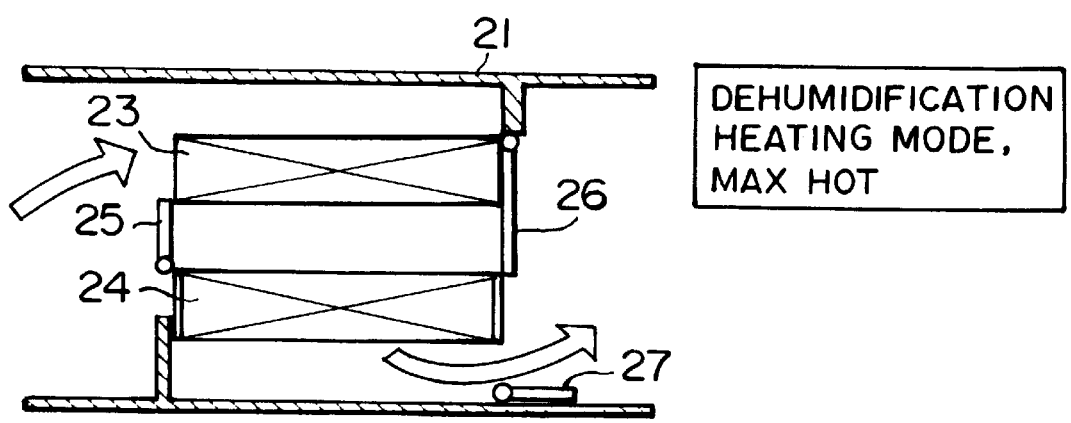
FIG. 1C — DEHUMIDIFICATION HEATING MODE, MAX HOT

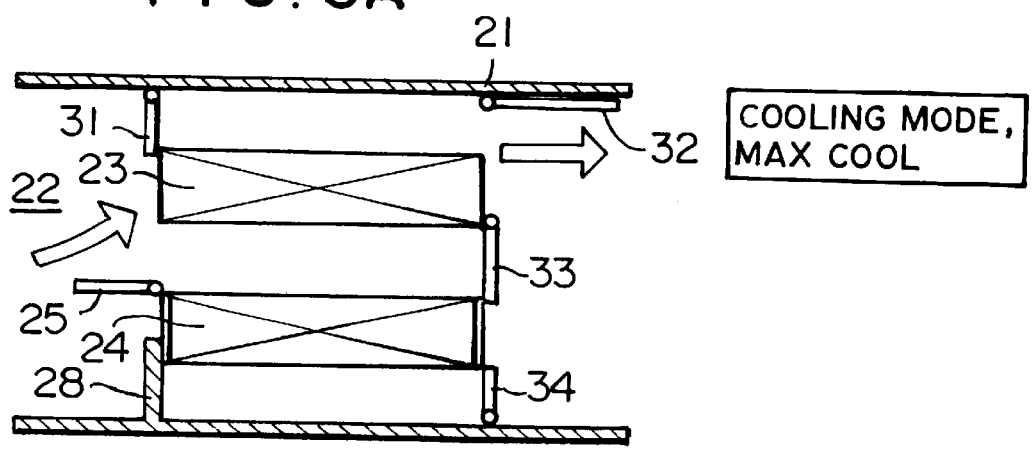
FIG. 3A — COOLING MODE, MAX COOL
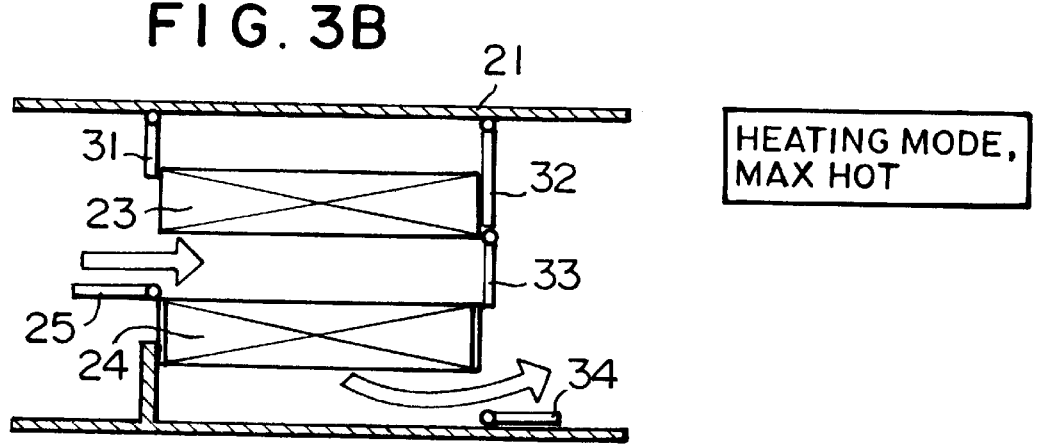
FIG. 3B — HEATING MODE, MAX HOT
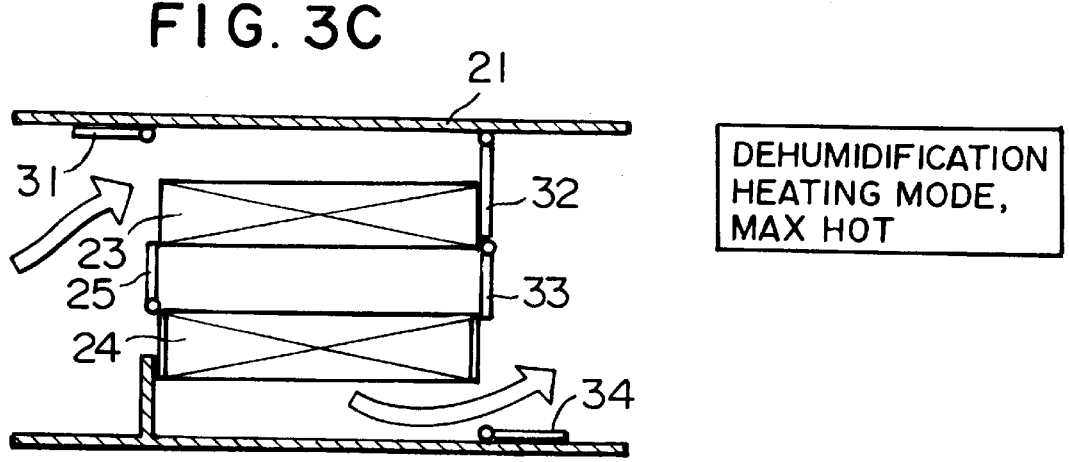
FIG. 3C — DEHUMIDIFICATION HEATING MODE, MAX HOT

DEHUMIDIFICATION A/C MODE

A/C MODE

AIR CONDITIONER WITH HEATING, COOLING AND REHEAT

BACKGROUND OF THE INVENTION

1. Field of the Invention

The present invention relates to an air conditioner suitable for vehicles, and more specifically, to an air conditioner capable of satisfying various size limitations, particularly, height or width limitations imposed by the size of an air duct of the air conditioner.

2. Description of the Related Art

A known air conditioner for vehicles is depicted in FIG. 4.

In FIG. 4, a path 100 for air subjected to a heat exchange process is formed in an air duct 1 of an air conditioner 200. In air path 100, blower 2, evaporator 3 as a cooling device, and heater core 4 as a heating device are provided, in that order, from the upstream side to the downstream side in the flow direction of air subjected to the heat exchange process (i.e., the direction shown by arrow AF in FIG. 4). A vehicle occupant may adjust the relative degree of opening of vehicle compartment inside air intake port 6 and of vehicle compartment outside air intake port 7 by means of rotary-type damper 8. Controlled inside air (REC.) or outside air (FRE.), or both, is (are) thereby introduced into air path 100 by blower 2 as air subjected to the heat exchange process.

Air mixing damper 5 is provided at a position upstream of heater core 4. The air flowing in air duct 1 is controlled in any mode of passing through heater core 4, bypassing heater core 4, or mixing such air flows by adjustment of damper 5. Air path 100 diverges between discharge ports 9, 10 and 11, for example, DEF, VENT, and FOOT ports, at positions downstream of heater core 4. Dampers 12, 13, and 14 are provided between air path 100 and discharge ports 9, 10, and 11, respectively. The controlled air is discharged into the interior of the compartment of the vehicle through one or more discharge ports which are in communication with air path 100 and are opened selectively by operation of dampers 12, 13, and 14.

Recently, spaces available for receiving an air conditioner in a vehicle have become confined, because, for example, of the addition of various electronic devices mounted on the vehicle.

Therefore, the size of air conditioners for vehicles has been reduced, e.g., reduced in thickness, and particularly, the height or the width of air ducts thereof has been reduced. However, in the above-described air conditioner 200, there are limits to the ability to reduce air duct 1 height, because evaporator 3 and heater core 4 are arranged in series along air duct 1, and because an adequate size space for the operation of air mixing damper 5 must be maintained. Further, it is difficult to reduce the width of air duct 1, because the longitudinal axis of evaporator 3 is aligned with the width of air duct 1, i.e., in a direction across air path 100. Therefore, known air conditioners, such as the one described above, cannot satisfy size limitations imposed by the reduced size of the air duct.

Further, in a structure wherein heater core 4 is disposed at an inclined orientation and a bypass air path is formed above the inclined heater core 4, it is difficult to satisfy size limitations imposed by the reduced size of the air duct.

Moreover, in a structure wherein evaporator 3 and heater core 4 are arranged in series, even in a cooling mode or a heating mode, an air flow passes through both devices, or one device becomes a barrier to the air flow. Therefore, in such a condition, a problem of reduction of air flow is experienced, particularly, in a cooling mode or a heating mode.

SUMMARY OF THE INVENTION

It is an object of the present invention to provide an air conditioner which satisfies the air conditioner size limitations, thereby reducing the overall size and thickness of the entire air conditioner.

The above and other objects may be achieved by air conditioners according to the present invention. Such air conditioners include an air duct having a longitudinal axis and defining an air path in the air duct. A cooling device and a heating device are provided in the air path. The cooling and heating devices are arranged in a direction across the longitudinal axis of the air duct and disposed in parallel along the longitudinal axis of the air duct. The cooling and heating devices define an upstream side wherefrom the devices receive an air flow and a downstream side wherefrom the air flow exits the devices. Switching means are provided at positions on the upstream and downstream sides of the cooling and heating devices, respectively, for controlling air flow into and air flow from the cooling device or the heating device, or both.

In such air conditioners, each of the cooling and heating devices may have a longitudinal axis and the longitudinal axes of the cooling and heating devices may be aligned with the longitudinal axis of the air duct. As noted above, it is preferred that the cooling and heating devices are disposed in parallel to each other. Each of the switching means may be a damper adjustable in its degree of opening. The switching means may define a cooling mode, a heating mode, and other air conditioning modes to the air conditioner.

In another embodiment, the cooling device or the heating device, or both, is (are) a heat exchanger which is substantially not restricted in air flow direction. For example, such a heat exchanger may be a multi-tube heat exchanger having a pair of tanks spaced from each other and a plurality of heat transfer tubes fluidly interconnected between the pair of tanks.

In the air conditioner, because the cooling and heating devices are disposed in parallel with respect to the longitudinal axis of the air duct, the length of the air duct is decreased, as compared with that of a known air conditioner wherein cooling and heating devices are disposed in series. Consequently, the size of the entire air conditioner is reduced by the reduction of the air duct length. If the longitudinal axes of the cooling and heating devices are aligned with the longitudinal axis of the air duct, the width of the air duct is also decreased, thereby making the air duct thinner. Further, the weight of the air conditioner may be reduced by the reduction of the size of the air duct.

Further, when such cooling and heating devices and the air duct are assembled as a unit, fabrication of the air conditioner and parts control is facilitated, and it is possible to reduce the size of the air conditioner.

The flow of air into the parallel cooling and heating devices and the flow from the parallel cooling and heating devices are adjusted by the switching means in accordance with a desired air conditioning mode. Because the cooling and heating devices are disposed in parallel, an air flow only through the cooling device and an air flow only through the heating device may be achieved. Therefore, a sufficient amount of air flow may be ensured without decreasing the amount, even in a cooling mode or a heating mode.

Further objects, features, and advantages of the present invention will be understood from the following detailed description of embodiments of the present invention with reference to the appropriate figures.

BRIEF DESCRIPTION OF THE DRAWINGS

Embodiments of the invention will now be described with reference to the appropriate figures, which are given by way of example only, and are not intended to limit the present invention.

FIG. 1A to FIG. 1E are partial cross-sectional views of a schematic of an air conditioner according to a first embodiment of the present invention, showing damper conditions and air flows for various operational modes.

FIG. 3A to FIG. 3E are partial cross-sectional views of a schematic of an air conditioner according to a second embodiment of the present invention, showing damper conditions and air flows for various operational modes.

DETAILED DESCRIPTION OF PREFERRED EMBODIMENTS

Figure 1D:
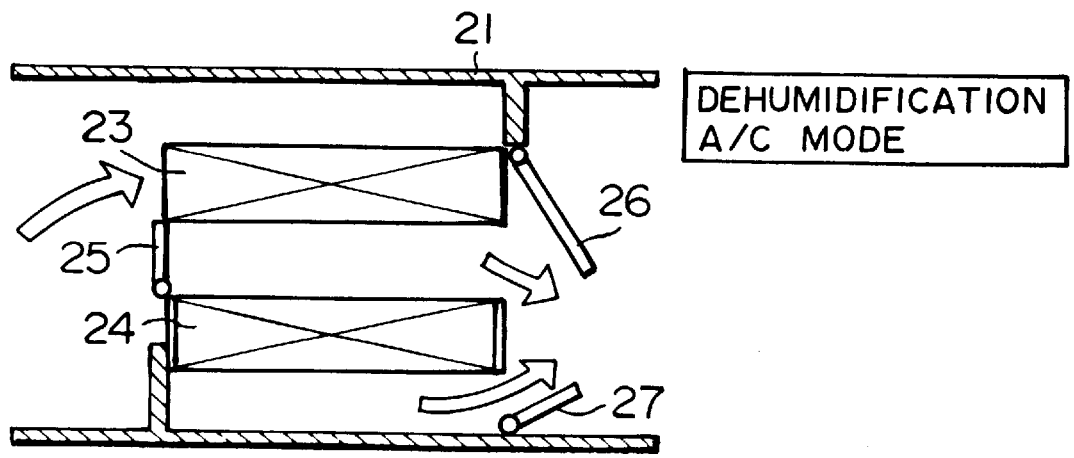

Referring to FIG. 1A, an air conditioner has an air duct 21 defining an air path 22 in air duct 21 according to a first embodiment of the present invention. Cooling device 23 (for example, an evaporator) and heating device 24 (for example, a heater core) are provided in air path 22. Cooling device 23 and heating device 24 are arranged in a direction across a longitudinal axis of air duct 21 and disposed in parallel in a longitudinal axis of air duct 21. At least one of cooling device 23 and heating device 24 is preferably formed as a multi-tube heat exchanger as described later. In this embodiment, cooling device 23 and heating device 24 are disposed in parallel to each other, in a condition wherein the longitudinal axes of cooling device 23 and heating device 24 are aligned along the longitudinal axis of air duct 21. However, when cooling device 23 and heating device 24 are relatively small, their longitudinal axes do not impose restrictions upon their orientation, and they may be disposed in parallel in air duct 21. When cooling device 23 or heating device 24, or both, is (are) formed as a multi-tube heat exchanger, the heat transfer tubes of the multi-tube heat exchanger preferably extend in a vertical direction. In such a case, FIG. 1A to FIG. 1E should be viewed as cross-sectional plan views. Condensed water may flow down along vertically extended heat transfer tubes.

Switching means, such as damper 25, for switching and adjusting air flow into cooling device 23 or heating device 24, or both, is provided at a position upstream of parallel cooling device 23 and heating device 24. Switching means, such as dampers 26 and 27, for switching and adjusting air flow from cooling device 23 or heating device 24, or both, are provided at a position downstream of parallel cooling device 23 and heating device 24. In this embodiment, these switching means, e.g., dampers 25, 26 and 27, comprise rotary-type dampers adjustable in opening degree, respectively. However, slide-type or other types dampers also may be employed.

An inner projecting wall 28 is provided on the inner surface of air duct 21 between the upstream side of heating device 24 and the inner surface of air duct 21 for sealing this space. An inner projecting wall 29 is provided on the inner surface of air duct 21 between the downstream side of cooling device 23 and the inner surface of air duct 21 for sealing this space. These walls 28 and 29 are formed integrally with air duct 21. Further, in this embodiment, cooling device 23, heating device 24 and air duct 21 are assembled as a unit capable of being manipulated as a single assembly unit. The portion in air duct 21 to be assembled as the unit may be either a portion of air duct 21 or the entire air duct 21 having a predetermined length.

Figure 2:
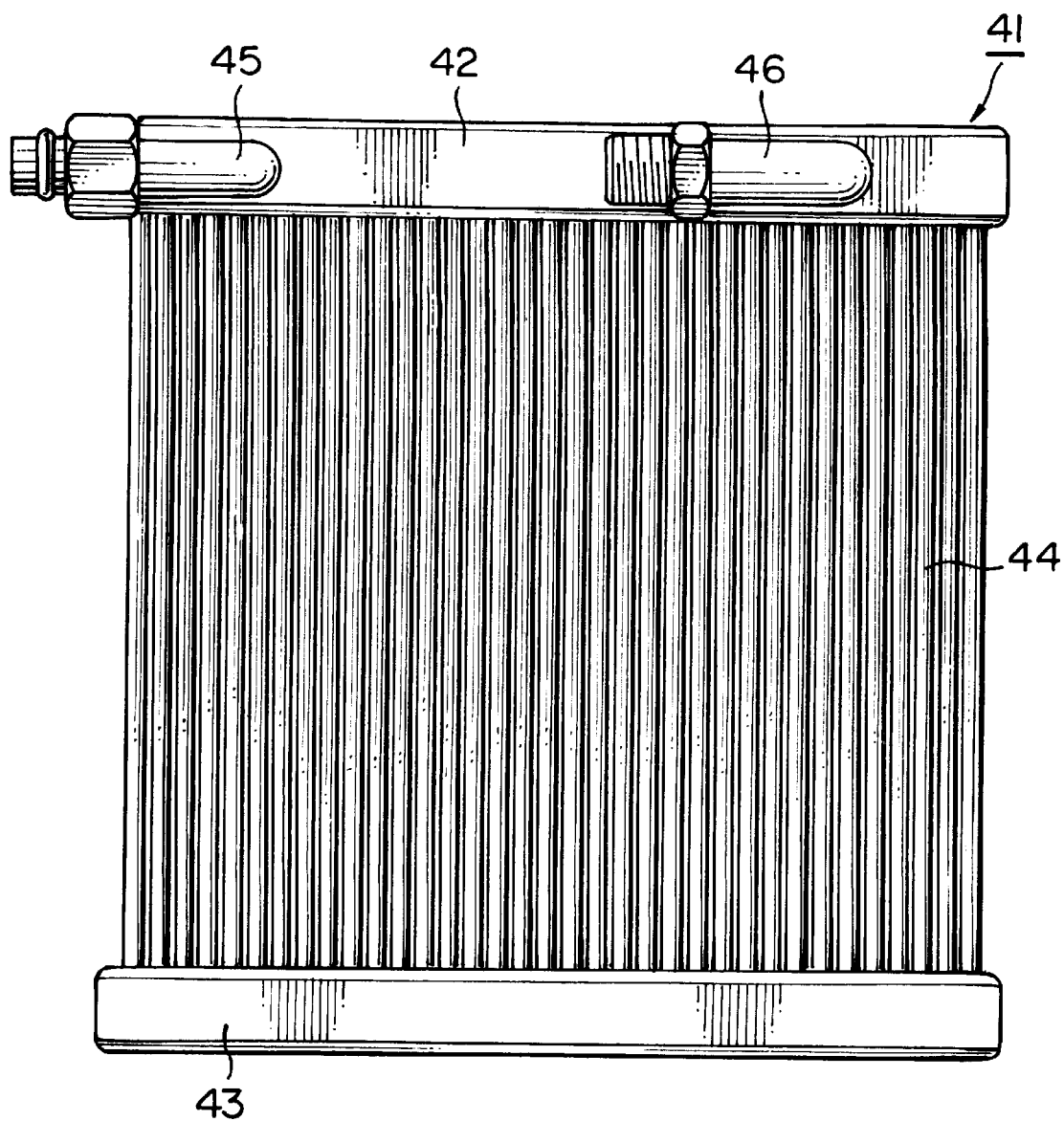
FIG. 2 is an elevational view of a heat exchanger suitable as a cooling or heating device, or both, for use in an air conditioner according to the present invention.

FIG. 2 depicts a typical multi-tube heat exchanger suitable for use as cooling device 23 or heating device 24. Multi-tube heat exchanger 41 includes a pair of tanks 42 and 43 and a plurality of heat transfer tubes 44 fluidly interconnected between tanks 42 and 43. Each of heat transfer tubes 44 preferably has a circular cross-section. Inlet pipe 45 and outlet pipe 46 are connected to tank 42. A heat exchange medium is introduced into heat exchanger 41 through inlet pipe 45, circulates in heat exchanger 41, and discharges from heat exchanger 41 through outlet pipe 46.

In the air conditioner shown in FIG. 1, because cooling device 23 and heating device 24 are disposed in parallel along the longitudinal axis of air duct 21, the space occupied by these devices is reduced in the longitudinal direction of air duct 21, as compared with that in the known air conditioner wherein these devices are disposed in series. Consequently, the length of air duct 21 is reduced by the parallel disposition of these devices. Therefore, air duct 21 is made smaller particularly in its longitudinal direction, i.e., its length, and ultimately, the size of the entire air conditioner may be greatly reduced.

Further, in this embodiment, because the longitudinal axes of cooling device 23 and heating device 24 are aligned with the longitudinal axis of air duct 21, and these devices are disposed in parallel to each other, the size across air path 22, that is, the width of air duct 21, may consequently be reduced, thereby reducing the cross-sectional area of air duct 21 and the size of the entire air conditioner. Further, it is possible to reduce the weight of the air conditioner by such a reduction in size.

In air conditioners thus reduced in size, respective operational modes are controlled as follows.

FIG. 1A depicts operation in a cooling mode. Dampers 25 and 27 are closed, and damper 26 is opened. Air flows into cooling device 23 and passes through cooling device 23, and the cooled air is sent to the downstream side through a space between cooling device 23 and heating device 24 without passing through heating device 24.

FIG. 1B depicts operation in a heating mode (MAX HOT). Dampers 25 and 27 are opened, and damper 26 is closed. Air blown into a space between cooling device 23 and heating device 24 passes only through heating device 24, and thereafter, flows downstream.

Fig. 1C depicts operation in a dehumidification heating and maximum heating mode. Dampers 25 and 26 are closed, and damper 27 is opened. The entire amount of air passes first through cooling device 23 and then through heating device 24 and is thereby heated after first being cooled and dehumidified.

Fig. 1D depicts operation in a dehumidification air conditioning (A/C) mode. Damper 25 is closed, and dampers 26 and 27 are opened at adjusted opening degrees. The entire amount of air passes through cooling device 23 and is cooled and dehumidified. Then, a first portion of the air is sent directly to downstream side, and a second portion of the air passes through heating device 24 and is sent to downstream side after heated. On the downstream side, the cooled and dehumidified air and the dehumidified then heated air are mixed to obtain a desired air condition, and this conditioned air is then ducted to a compartment of a vehicle.

Figure 1E:
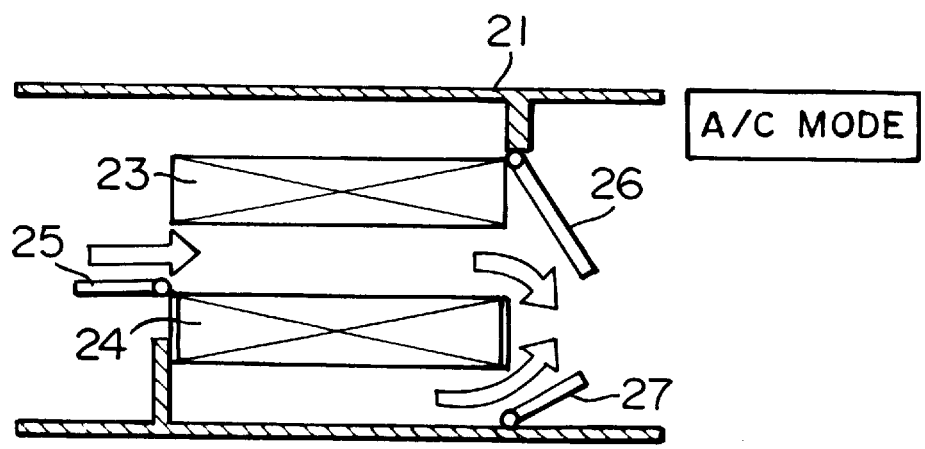

FIG. 1E depicts operation in an air conditioning mode. Damper 25 is opened, and dampers 26 and 27 are opened at adjusted opening degrees. A first portion of air blown into a space between cooling device 23 and heating device 24 is sent directly to the downstream side, and a second portion of the air passes through heating device 24, and flows downstream after being heated. On the downstream side, the unheated air and the heated air are mixed to obtain a desired air condition, and this conditioned air is then ducted to a compartment of a vehicle.

Thus, the air conditioner may be controlled to obtain any desired operational mode by switching and adjusting respective dampers. Particularly, in the cooling or heating mode, the air passes only through one of parallel cooling device 23 and heating device 24. Therefore, the resistance against air flow is greatly decreased as compared with known air conditioners in which the cooling and heating devices are disposed in series, thereby preventing the reduction of the amount of the passing air through a particular device. As a result, an air moving means (for example, a fan or blower) may be smaller, and energy savings also are possible. Further, particularly by preventing the reduction of amount of the passing air, the efficiency and effectiveness of the heating mode is increased.

FIG. 3A to FIG. 3E depict operation in operational modes of another air conditioner according to a second embodiment of the present invention. In this embodiment, on the upstream side, damper 31 is provided between the upstream side of cooling device 23 and the inner surface of air duct 21, in addition to damper 25. On the downstream side of parallel cooling device 23 and heating device 24, three dampers 32, 33, and 34 are provided.

Figure 3D:
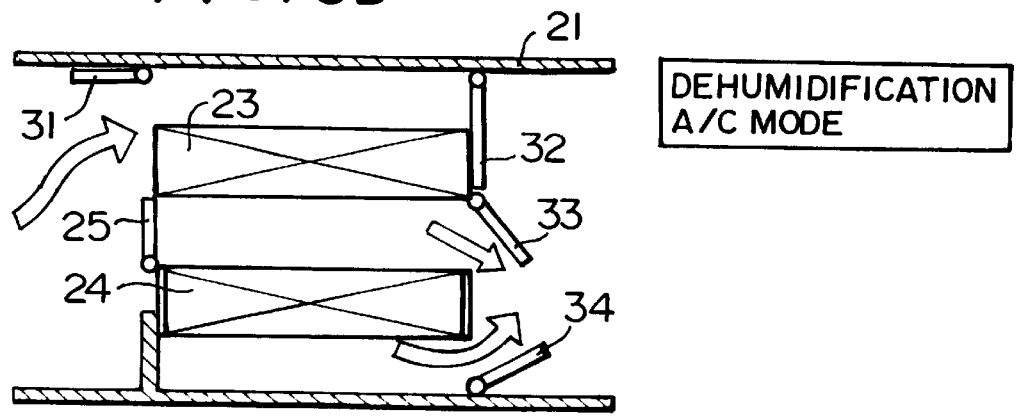
Figure 3E:
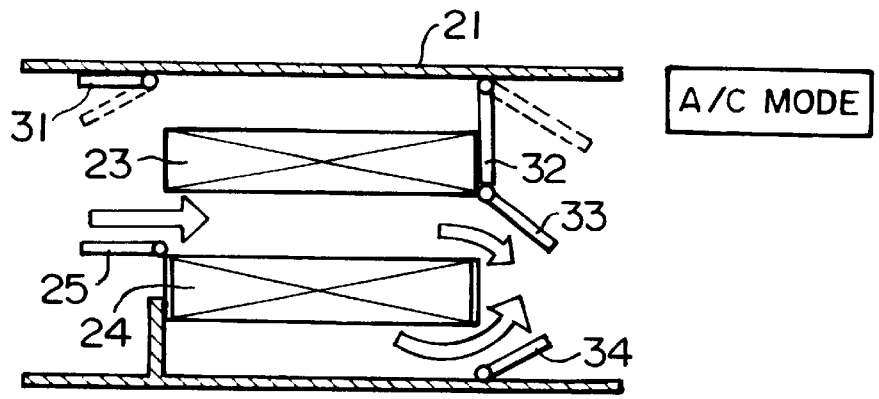
Figure 4:
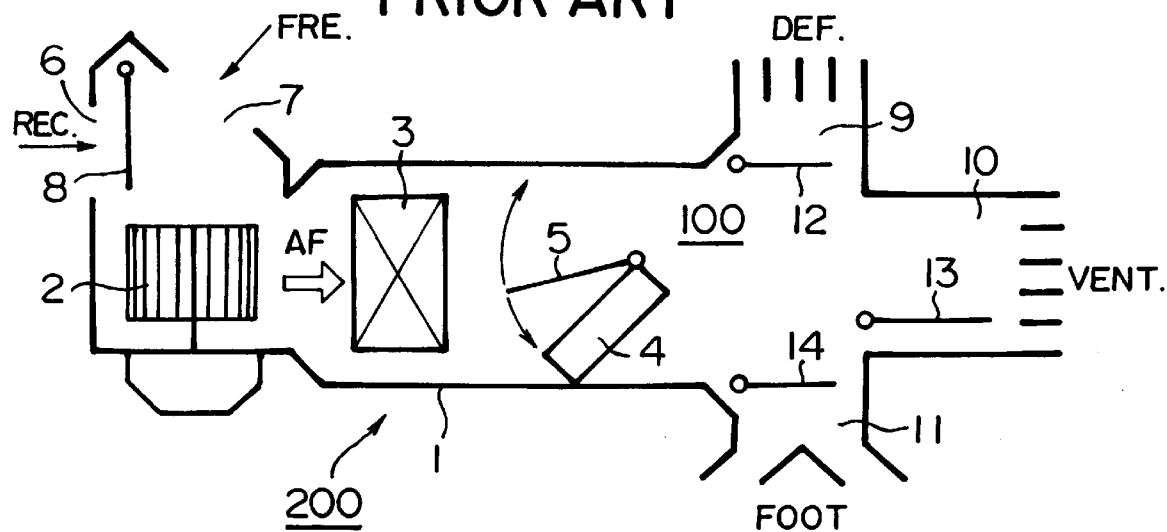
FIG. 4 is a cross-sectional view of a schematic of a known air conditioner.

FIG. 3A shows operation in a cooling mode. The modes shown in FIG. 3B to FIG. 3E correspond to the modes shown in FIG. 1B to FIG. 1E, respectively. In this embodiment, substantially the same advantages as those in the aforementioned first embodiment may be obtained.

Although several embodiments of the present invention have been described in detail herein, the scope of the invention is not limited thereto. It will be appreciated by those skilled in the art that various modifications may be made without departing from the scope of the invention. Accordingly, the embodiments disclosed herein are only exemplary. It is to be understood that the scope of the invention is not to be limited thereby, but is to be determined by the claims which follow.

What is claimed is:

1. An air conditioner with an air duct having a longitudinal axis and defining an air path in the air duct, said air conditioner comprising:

a cooling device and a heating device provided in said air path, said cooling and heating devices having respective longitudinal axis parallel to said longitudinal axis of said air duct and extending across said air duct in adjacent and spaced-apart relation whereby said cooling and heating devices define an upstream side wherefrom said devices receive an air flow and a downstream side wherefrom said air flow exits said devices; and switching means provided at positions on said upstream and downstream sides of said cooling and heating devices, respectively, for controlling air flow into and air flow from said cooling device and said heating device and for establishing selectively a cooling mode, a heating mode, and an air conditioning mode of said air conditioner.

2. The air conditioner of claim 1, wherein each of said longitudinal axes of said cooling and heating devices are aligned with said longitudinal axis of said air duct.

3. The air conditioner of claim 1, wherein each of said switching means is a damper adjustable in opening degree.

4. The air conditioner of claim 1, wherein at least one of said devices comprises a multi-tube heat exchanger having a pair of tanks spaced from each other and a plurality of heat transfer tubes fluidly interconnected between the pair of tanks.

5. The air conditioner of claim 1, wherein said cooling and heating devices and said air duct are assembled as a unit.

6. The air conditioner of claim 1, wherein said air duct has an inner projecting wall which creates a seal between an inner surface of said air duct and at least one of said devices.

\* \* \* \* \*